April 23, 1946.  F. D. WELCH  2,398,984
SECRET FASTENER
Filed May 3, 1944
Fig. 1.
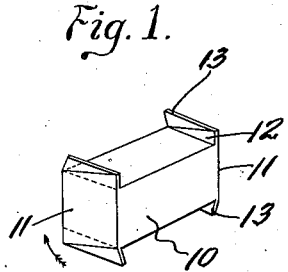
Fig. 2.
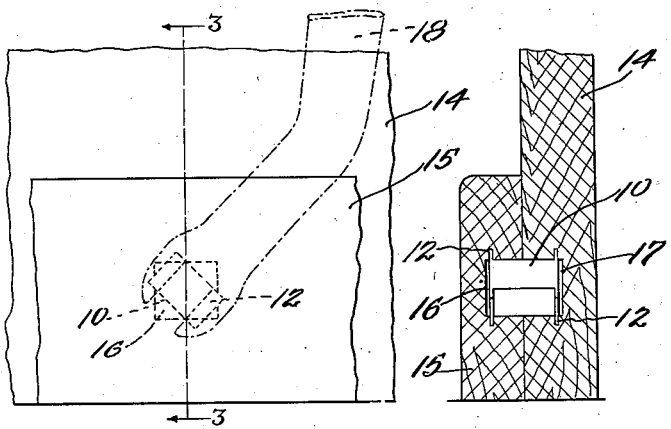
Fig. 3.
Fig. 5.
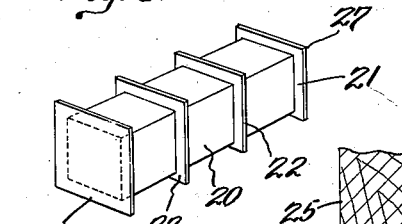
Fig. 6.
Fig. 4.
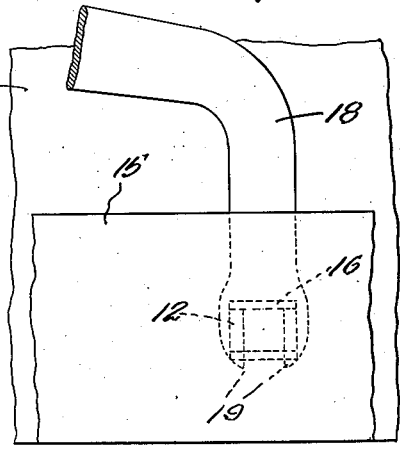
Fig. 7.
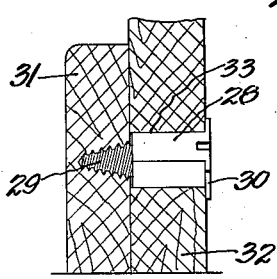
Fig. 9.
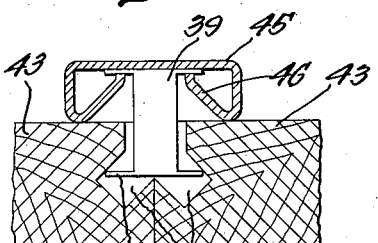
Fig. 10.
Fig. 8.
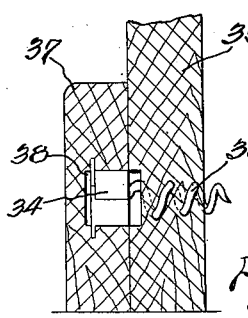
Fig. 11.
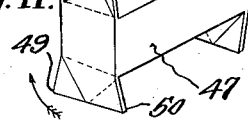
INVENTOR.
Floyd D. Welch.
BY Wilfred E. Lawson
ATTORNEY.

Patented Apr. 23, 1946

2,398,984

UNITED STATES PATENT OFFICE 2,398,984

SECRET FASTENER

Floyd D. Welch, Shreveport, La.

Application May 3, 1944, Serial No. 533,892

15 Claims. (Cl. 85—42)

This invention relates generally to builder's hardware and pertains particularly to improvements in fastening or securing devices.

The principal object of the present invention is to provide an improved fastener or securing device for securing or coupling two pieces of material in such a way that when the desired connection between the pieces has been accomplished the securing element will be entirely hidden from view.

Another object of the invention is to provide a securing device of the character stated which is designed in a novel manner whereby, after it has been turned into working position, it will function automatically to pull the two pieces of work tightly together.

Still another object of the invention is to provide a hidden fastening device which is designed to be turned or rotated into securing position and which when used in association with bodies of wood or other similarly soft material, will cut or bite into the material, when turned, to establish a secure locking connection therewith.

A still further object of the invention is to provide a hidden securing or fastening device having opposite ends provided with spirally directed resilient flanges which cut into the pieces of material being secured together, when the device is turned, and draw the pieces of material tightly into abutting relation.

Other objects and advantages of the invention will become apparent as the description of the same proceeds and the invention will be best understood from a consideration of the following detailed description taken in association with the accompanying drawing forming a part of this specification, with the understanding, however, that the invention is not confined to a strict conformity with the showing of the drawing but may be changed or modified so long as such changes or modifications do not depart materially from the salient features of the invention as expressed in the appended claims.

In the drawing:

Figure 1 is a view in perspective of one embodiment of the fastener device of the present invention.

Figure 2 is a view in elevation of two pieces of material, the device being shown in dotted outline in locking position between the material, with the wrench means employed for turning the securing device also shown in broken lines.

Figure 3 is a sectional view taken substantially on the line 3—3 of Figure 2.

Figure 4 illustrates in dotted outline the starting position for the securing element, the turning wrench therefor being shown partly in elevation and partly in dotted outline behind one of the two pieces of material coupled together by the device.

Figure 5 is a view in perspective of another embodiment of the fastening device.

Figure 6 is a view illustrating the application of the fastener shown in Figure 5.

Figure 7 illustrates the combination of the fastener device with a screw or similarly threaded member.

Figure 8 illustrates the use of the fastener device in combination with a screw fastener similar to a corkscrew.

Figure 9 illustrates a modification of the embodiment illustrated in Figure 1.

Figure 10 illustrates the use or application of the modification shown in Figure 9.

Figure 11 illustrates still another form or embodiment of the fastening device.

Referring now more particularly to the drawing, Figure 1 illustrates an embodiment of the hidden or secret fastener which has a double head. The body of the fastener is designated 10 and at each end is a head 11 which, together with the end of the body 10, comprises the oppositely positioned and oppositely directed blades or blade flanges 12. Each of these blade flanges is bent inwardly slightly as indicated at 13, the inbent portion of one blade flange being diagonally positioned with respect to the body 10, from the corresponding portion of the other blade flange of the head so that such inbent portions of the head flanges will have a resilient pulling action when the adjacent straight part of the blade is turned into a piece of material in the manner hereinafter described.

Figures 2, 3 and 4 illustrate the application of the fastener shown in Figure 1. In these figures there is shown a body 14 which may represent a wall board against the lower part of which is to be secured a base-board 15.

In applying the base-board to the board 14 by means of the fastener device 10, the two bodies 14 and 15 have formed in the opposing faces thereof the openings or sockets 16 and 17. These are located at the proper height to be aligned when the pieces of material are placed in proper assembled relation and each opening has a cross sectional dimension greater in one direction than the other so that a headed end of the fastener may be inserted therein but the fastener cannot be axially rotated without causing the corners of the blade flanges 12 to cut into the material of the body in which the head end is located.

Figure 4 shows the initial disposition of the fastener in the openings 16 and 17 and also illustrates a wrench 18 employed for turning the fastener. The head end of this wrench, which is provided with a suitable socket 19 to receive the square body portion 10 of the fastener, is relatively thin, approximately $\frac{3}{32}$ of an inch, to be inserted between the bodies 14 and 15 so that the body 10 of the fastener may be engaged. When so engaged the wrench is turned to the position shown in broken lines in Figure 2, thereby causing the fastener 10 to turn on its long axis and forcing the straight corners of the flanges 12 of the heads into the walls of the openings in which the heads are located.

When the blades are so forced into the material it will be seen that the inturned ends of the blades will follow the straight corner portions which have been caused to cut or bite into the material. This will tend to straighten out the bent in portions 13 and consequently when the wrench 18 is withdrawn from between the bodies 14 and 15 the tensioned inturned portions 13 of the blades will tend to resume their normal positions and in so doing will draw the two bodies 14 and 15 firmly together in the manner illustrated in Figure 3.

In Figures 5 and 6, the fastener is shown in modified form wherein the body portion 20, which is rectangular in cross section, has the encircling blade flanges 21 at the ends thereof and intermediate the ends are corresponding encircling blade flanges 22. This fastener, when it is mounted in position in openings 23 and 24, in abutting members 25 and 26, as shown in Figure 6, will be locked in position when it is given a one-eighth turn, by the corners 27 of the encircling blade flanges cutting or biting into the material, as shown in Figure 6.

While the body 20 has been illustrated with a number of encircling blade flanges it is to be understood that it may also be made only with the end flanges and of shorter length than shown.

Figure 7 shows the application of the invention to a body 28 which may be of square cross section like the body 10, which has formed integrally at one end a wood-screw 29. The other end of the body 28 is provided with a head corresponding to one end of the body 10, that is, it is provided with the oppositely directed and positioned resilient blades or blade flanges 30 each of which is bent or curved slightly in correspondence with the curve 13 of a blade 12.

In the use of this form of fastener the screw 29 is first turned into the piece of material 31 upon the back thereof or that face which is to be disposed against the wall material 32. The head 30 of the body 28 is then extended into the opening 33 which is formed in the wall material 32, until the head is located upon the rear side of the latter whereupon the securing element body 28 will be turned by inserting the thin wrench 18 between the parts 31 and 32, to engage the blade flanges 30 against the rear face of the wall part 32, in the manner illustrated. The threads of the screw are left-hand and as the body 28 is turned counter-clockwise, the parts 31 and 32 will be drawn together simultaneously with the turning of the securing element.

Figure 8 illustrates still another embodiment of the invention in which the fastener, which is generally designated 34, is provided with a type of screw similar to a corkscrew. This form of screw is provided to facilitate the attachment of the device to the wall 35, which may be constructed of very soft wood or fiber board, so that the corkscrew portion 36 of the fastener device can be threaded into the wall portion 35 by hand. In this arrangement the applied material 37 has an opening formed therein to receive the headed end of fastener 34, such opening being designated 38 and being of a depth less than the thickness of the material. Thus when the flanged head end of the fastener 34, which is constructed like one end of the fastener shown in Figure 1, is inserted into the opening 38 and the body of the fastener is turned in the manner previously described in connection with the other devices, the blade flanges of the head will bite into the material of the applied body 37 and such body will be drawn up tightly against the wall.

In Figure 9 there is illustrated a modified embodiment of the fastener of Figure 1. In this embodiment where the body portion is designated 39, the blades or blade flanges 40 are turned outwardly at one corner as indicated at 42 and the out-turned corners of the blades upon one side of the body are diametrically opposite from the out-turned corners of the flanges at the opposite side of the body. In the use of this embodiment of the fastener the same is turned on its long axis in the direction of the arrow so that the out-turned corners of the blades advance in the material during such turning and create the desired pressure or force axially of the body to pull together the members in which the flange ends of the fastener are located.

It will be noted that the embodiment of the device shown in Figure 1 functions oppositely to the embodiment of Figure 9. By this it is meant that in the embodiment shown in Figure 1 the turned corners 13 trail the straight advancing edge of the blade whereas in the embodiment of Figure 9 such turned corners lead as stated.

Figure 10 illustrates the application of the modification shown in Figure 9, where a pair of pieces of material 43 are brought into edge abutting relation and are provided with adjacent openings in their edges, which combine to form a single opening in which the end of the body 39 is inserted.

The numeral 45 designates a trim strip having inturned flanges 46 between which the body 39 is located. As will be readily apparent when one end of the fastener 39 is inserted in the back of the trim strip 45 between the inturned flanges 46, and the other head is inserted into the coacting openings 44 and the body turned, the flanges in the openings 44 will enter into the lateral extensions of the inner ends of the openings while the flanges at the outer end of the fastener will enter between the edges of the trim flanges 46 and the face of the trim, as illustrated, so that the trim will be securely fastened against the face of the wall in covering relation with the seam formed by the butting edges of the wall portions 43.

It will, of course, be understood that the thin wrench 18 would be employed for turning the fastening device in each of the embodiments illustrated.

Figure 11 illustrates still another embodiment of the fastener wherein the blades or blade flanges are turned to have a spiral form and to have a screw action when the body 47 is turned in the direction indicated by the arrow shown at the end of the device.

In this embodiment the blade flanges at the end of the body are designated 48 and each of these blade flanges has an out-turned corner 49 and an inturned corner 50. The out-turned corners 49 of each two longitudinally spaced blade flanges 48 are directly opposite one another longitudinally of the body and these corners of the one pair are diagonally spaced from the out-turned corners of the other two longitudinally spaced flanges. Thus the in-turned corners of one longitudinally spaced pair of blade flanges are diagonally separated from the corresponding corners of the other longitudinally spaced pair of flanges. With this arrangement the two blade flanges at each end of the body function in the nature of screws to produce the desired results when the body is axially turned while each blade flange end is disposed within a bore formed in one of the two members which the device is designed to couple together.

From the foregoing description it will be readily apparent that when the several fastening devices, or the several embodiments of the invention as illustrated, are employed for securing together pieces of wood or other relatively soft material, the flanges carried by the rotatable bodies will cut into the material and thus establish a locking connection therewith. In the case of harder material where the flanges could not bite or cut thereinto, suitable channels or recesses would be formed at the inner ends of the openings into which the flanges might engage.

It will be readily apparent from the foregoing that the fastening device herein described provides an inexpensive, easily applied means of establishing a blind or secret connection between constructional materials.

I claim:

1. A rotary fastening device of the character described, comprising a body having length and having at least two opposite flat sides, the body being designed for free insertion into a preformed opening of polygonal cross section and a single means at each end of the body for securing the body to one of two pieces of material to be secured together, one of said means comprising a material penetrating flat blade flange formed across and extending outwardly from each of the said flat sides and designed to establish a prescribed fastening connection with one of the said pieces of material in consequence of the turning of the body on its long axis.

2. A rotary fastening device of the character described in claim 1, in which each of said flanges is of flexible character and has a portion only bent away from a plane perpendicular to the adjacent flat side.

3. A rotary fastening device of the character described in claim 1, in which the other one of said means comprises a pointed penetrating element extending axially from an end and lengthwise of the body.

4. A rotary fastening device of the character described, comprising a body having length and having at least two opposite flat sides, and material penetrating flanges at each end of the body, each of said flanges extending outwardly from and having a portion substantially perpendicular to a flat side and adapted to cut into material when the body is rotated on its long axis after insertion of the body into a preformed opening of polygonal cross section.

5. A rotary fastening device of the character described, comprising a relatively long body of rectangular cross section and having squared-off end faces, and a material engaging relatively thin, flat blade flange formed entirely around the body adjacent each end thereof, the blade flanges at the corners of the body being designed for material penetration upon axial rotation of the body, in a preformed opening of polygonal cross section.

6. A rotary fastening device as set forth in claim 5, with encircling thin, flat blade flanges formed entirely around the body between the end flanges.

7. A rotary fastening device of the character stated, comprising a body having length and having a substantially rectangular cross section, a pair of laterally extending relatively thin, flat blade flanges at one end of the body adapted for penetrating engagement when rotated in a supporting body into which the fastening body is introduced in a preformed opening of polygonal cross section, and a securing screw forming an integral longitudinal extension of the other end of the fastening body.

8. A rotary fastening device of the character stated, comprising a body having length and having a polygonal cross section, and laterally extending relatively thin, flat blade flanges formed at the ends of the body and adapted to cut into the material of a supporting body when the first mentioned body is turned axially in a preformed polygonal opening of the second mentioned body.

9. A rotary securing device of the character stated, comprising a device having length and having a polygonal cross section, oppositely directed laterally extending relatively thin, flexible blade flanges formed at one end of the body, each of said blade flanges being transversely bent along a line diagonal to an outer edge of the blade, and a pointed material penetrating element extending longitudinally from the other end of the body.

10. A fastening device of the character stated, comprising a body having length and having a polygonal cross section, oppositely directed flanges integral with and extending from each end of the body, each of said flanges having a corner bent outwardly away from the flange at the opposite end of the body, the out-bent corner of each flange being on the diagonal across the adjacent end of the body from the corresponding corner of the flange at the same end of the body.

11. A securing device of the character stated, comprising a body having length and having a polygonal cross section, oppositely directed flanges formed at each end of the body, each of said flanges having a corner turned inwardly toward the flange at the opposite end and having another corner bent outwardly away from the flange at the opposite end, the corresponding corners of the flanges at each end of the body being diagonally disposed across the adjacent end of the body.

12. A rotary fastening device designed to effect the coupling and drawing together of two pieces of material, comprising a body having length and designed to have each of its ends introduced into a preformed opening of polygonal cross section in one of the pieces of material, and means projecting laterally from each end of the body which is constructed and arranged to cut along a helical path concentric with the long axis of the body, into the material upon turning of the body on its long axis.

13. A rotary fastening device designed to effect the coupling and drawing together of two pieces of material, comprising a body having length and designed to have each of its ends introduced into an opening of polygonal cross section in one of the pieces of material, means projecting laterally from each end of the body which is constructed and arranged to cut into the material upon turning of the body on its long axis, and a resilient means forming an angularly extending part of each laterally projecting means and designed to impose a pull upon the adjacent piece of material to effect the shifting of the material axially of the body.

14. A rotary fastening device for securing together two pieces of material, comprising a relatively long body, means at an end of the body for anchoring the body end in one piece of material, and a resilient connecting section at an end of the body constructed and arranged to permit the pieces of material to be temporarily placed in separated relation and afterwards tending to draw the pieces together.

15. A rotary fastening device of the character described, comprising a body having length and having at least two opposite flat sides, material penetrating flanges at each end of the body, each of said flanges comprising a thin, flat blade extending outwardly from and having a portion substantially perpendicular to a flat side and adapted to cut into the material when the body is rotated on its long axis, and each of said blade flanges having two corners and having a portion of one corner bent in toward the transverse center of the body.

FLOYD D. WELCH.